United States Patent [19]

Bohnet et al.

[11] Patent Number: 5,540,527
[45] Date of Patent: Jul. 30, 1996

[54] DRILLING DEVICE HAVING A RADIALLY DISPLACABLE DRILL SHANK

[75] Inventors: Hartmut Bohnet; Stefan Lind, both of Waldachtal; Willi Haug, Freudenstadt-Musbach, all of Germany

[73] Assignee: Fischerwerke Artur Fischer GmbH & Co. KG, Waldachtal, Germany

[21] Appl. No.: 349,610

[22] Filed: Dec. 5, 1994

[30] Foreign Application Priority Data

Dec. 4, 1993 [DE] Germany .......................... 43 41 378.1

[51] Int. Cl.$^6$ .................................................. B23B 41/00
[52] U.S. Cl. ........................................... 408/147; 408/236
[58] Field of Search ............................... 408/89, 145, 147, 408/156, 236, 127; 82/1.2, 1.5; 409/143, 201

[56] References Cited

U.S. PATENT DOCUMENTS

| | | | |
|---|---|---|---|
| 2,441,158 | 5/1948 | Krasnow | 408/147 |
| 5,076,743 | 12/1991 | Mark . | |
| 5,226,763 | 7/1993 | Lind | 408/147 |
| 5,316,419 | 5/1994 | Bohnet et al. | 408/147 |

FOREIGN PATENT DOCUMENTS

| | | |
|---|---|---|
| 0336182 | 10/1989 | European Pat. Off. . |
| 3207599 | 9/1983 | Germany . |
| 8304014 | 7/1984 | Germany . |
| 3327409 | 2/1985 | Germany . |
| 0142611 | 5/1985 | Germany . |
| 3708080 | 9/1988 | Germany . |
| 4004485 | 8/1991 | Germany . |
| 4009735 | 9/1991 | Germany . |
| 4119350 | 5/1992 | Germany . |
| 4214343 | 11/1993 | Germany . |

*Primary Examiner*—Daniel W. Howell
*Attorney, Agent, or Firm*—Michael J. Striker

[57] ABSTRACT

The drilling device has a radially resilient shaft (3) which allows radial displacement of the drill bit (4) and the drill head (5). The radial displacement can be caused by a vibration device (8), but a self-excited oscillation of the resilient shaft (3) can also provide the desired radial displacement of the drill bit and the drill head. The drill shank (2) has a sleeve-shaped shank extension (17) provided with a damping chamber (18) filled with a damping agent (19) and the resilient shaft (3) is in the damping chamber (18) which is sealed by a radially resilient seal (21) surrounding the resilient shaft (3).

10 Claims, 5 Drawing Sheets

DRILLING DEVICE HAVING A RADIALLY DISPLACABLE DRILL SHANK

BACKGROUND OF THE INVENTION

The present invention relates to a drilling device having a radially displacable drill shank.

A drilling device is known having a drill bit chuck from which a drill bit having a front end abrasive face projects axially and which is driven by a drill shank. The drill bit of this drilling device and/or the panel in which a hole is to be made is arranged to be displaced radially with respect to a center line of the drill shank.

To produce drilled holes with an undercut, drilling devices are known which have as the drilling tool a drill bit having a drill head that widens towards the free end. The undercut at the bottom of the drilled hole is produced by displacing the drill head laterally by a swivelling motion or a gyratory motion. As this is happening, the undercut is reamed out in the area of the bottom of the drilled hole by lateral cutting edges or a lateral abrasive coating on the drill head. In order to produce not only the undercut but also the cylindrical part of the bore using such a drill head, the drill head is provided on its front end face with an abrasive coating, for example, of diamond chips. If it is desired to use this type of drill bit to produce the cylindrical part of the drilled hole in a facing panel, the entire front end face of the drilling head comes into engagement with the hard material of the facing panel. Because of the low cutting speed at the center of the front end face of the drill head, drilling has to be carried out with a high applied pressure, which leads to premature wear and blunting of the diamond chips. The service life of the drilling tool is consequently considerably reduced.

German Published Patent Application DE-A1 41 19 350 discloses a drilling device for producing drilled holes with an undercut in facing panels. The drilling machine disclosed therein, and thus also the drill bit attached thereto, is used for producing the undercut. To produce the undercut the drill bit is displaced away from the center line and is positively guided along a cam plate during the reaming-out operation. Swivelling is effected by hand and for that reason only a comparatively low speed gyratory movement of the drill bit is used during the reaming-out operation.

SUMMARY OF THE INVENTION

It is an object of the present invention to provide a drilling device of the above-described type which performs during drilling a radial relative movement between a drill bit head and a panel in which a hole having a cylindrical portion is to be made to increase the service life of the drill bit.

This object and others which will be made more apparent hereinafter is attained in a drilling device comprising a driven drill shank connected with a drill bit chuck, an axially projecting drill bit held in the drill bit chuck and having a front end abrasive face and means for relative displacement of at least one of the drill bit and panel radially relative to a center line of the drill shank.

According to the invention radially resilient bearing means for mounting the drill bit chuck are provided.

If the drill bit chuck and/or the panel are radially resiliently mounted, a self-excited oscillation can be induced at the drill head or panel. This oscillation of the drill head can be provided by forming the drill bit so that it is slightly out-of-balance or, in particular, by providing the drill bit with an asymmetrical front end face.

The preferred embodiment provides for the drill bit chuck to be attached to the drill shank by a resilient shaft. The resilient shaft can be manufactured from steel and can be of a diameter and a length so that the required resilience is achieved.

The resilient shaft can be located in a damping chamber filled with grease or another damping agent, to damp the oscillations of the shaft and thus also of the drill head.

The drilling device can also be equipped in the region of the resilient shaft with a vibration device which produces a defined oscillation. An electromagnet activated in pulses, the magnetic field of which acts directly on the shaft or on a ferromagnetic body attached thereto, can serve as the vibration device here. A radial displacement of the drill head can therefore be provided with a predetermined radial force and at a desired frequency. A stop member mounted on the resilient shaft can determine the maximum displacement of the drill head.

The panel, which is horizontally oriented on an oscillating table, can also be caused to oscillate horizontally by a vibration device. For that purpose too, an electromagnet that acts on a ferromagnetic element joined to the panel or to the oscillating table and causes this oscillation can be used.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
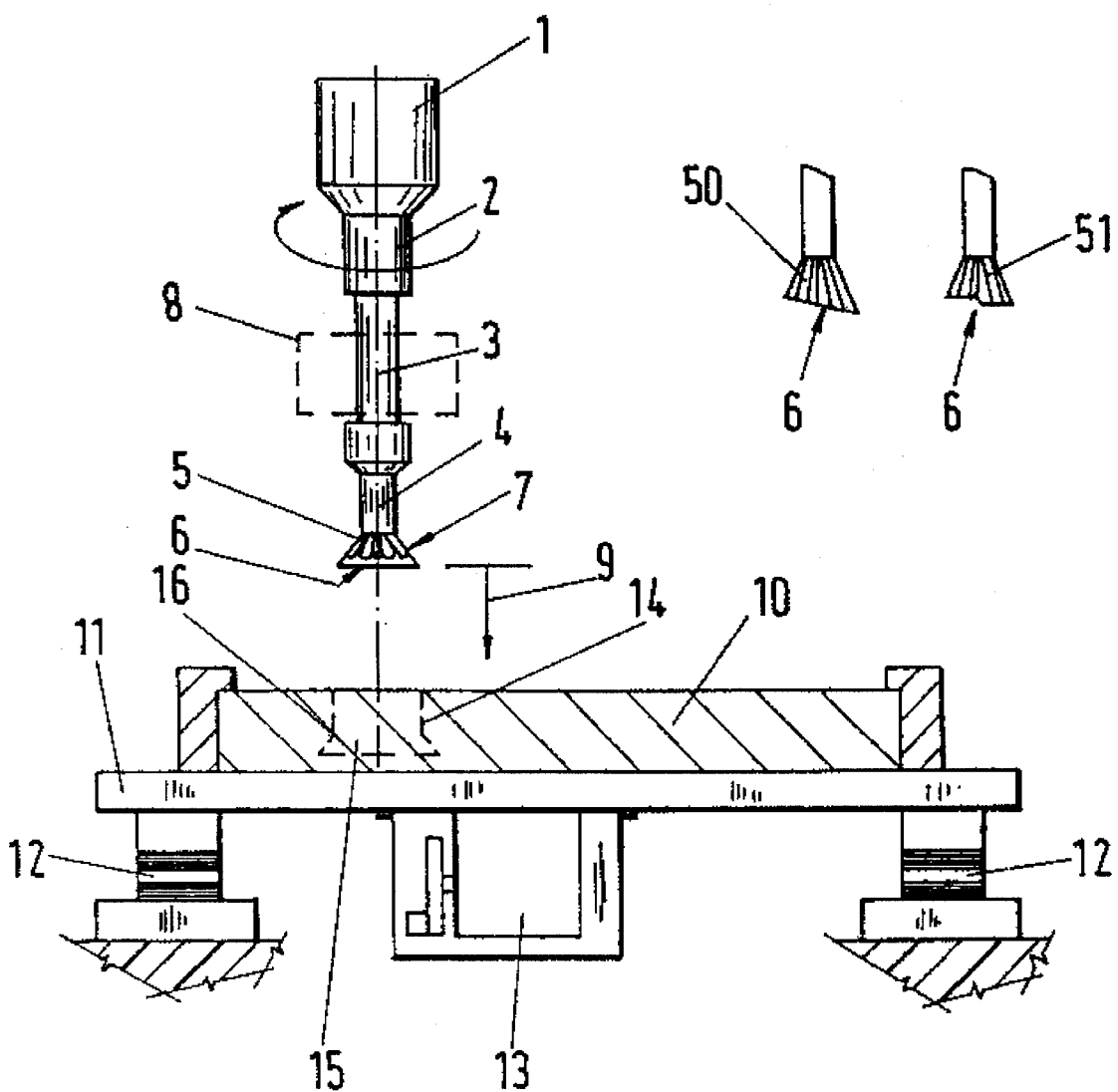
FIG. 1 is side view of a drilling device with an oscillating table.

The drilling device illustrated in FIG. 1 has a drive means 1 with a driven drill shank 2. The drive means and drill shank drives a drill bit 4 by means of a resilient shaft 3 connecting them. The drill bit 4 has a conically widening drill head 5 which at its front end abrasive face 6 and on its lateral face 7 is provided with an abrasive coating of diamond chips.

The resilient shaft 3 enables the drill head 5 to be resiliently displaced radially by self-excited or forcibly induced oscillations of the resilient shaft 3. By means of a vibration device 8, the shaft 3 can be caused to oscillate, so that the shaft 3 can also be said to have a definite displacement.

Self-excitation of the shaft 3 can be promoted by asymmetrical shaping of the drill bit 4 in the region of the drill head. A drill head 50 with an angled end face and a drill head 51 with a stepped end face are shown as separate embodiments illustrating this.

The drill bit 4 can be lowered in the direction 9 of the arrow onto a panel 10 to produce a drilled hole 15. The panel 10 is a facing panel which is positioned on an oscillating table 11. The oscillating table 11 is, in turn, supported by radially resilient bearing elements 12 and can be caused to vibrate horizontally by an eccentric drive motor 13 acting as the vibration device.

In the panel 10 in FIG. 1 a broken line illustrates an undercut hole or bore 15 in longitudinal section. This hole or bore 15 is made by the drill bit. As the cylindrical part 14 of the bore 15 is being made, a radial relative movement between the panel 10 and the drill head 5 is provided, in order to maintain relatively high abrasion or cutting speeds at the center of the abrasive face 6 of the drill head 5. If vibration devices are used to produce this relative movement, these are effective at least during the making of the cylindrical part 14 of the hole 15. In any case, as the undercut 16 is being reamed out, the drill head executes a gyratory movement or swivelling movement in a manner known per se and during the swivelling or gyratory motion a radial relative motion occurs between the drill head 5 of the drill bit 4 and the panel 10.

Figure 2:
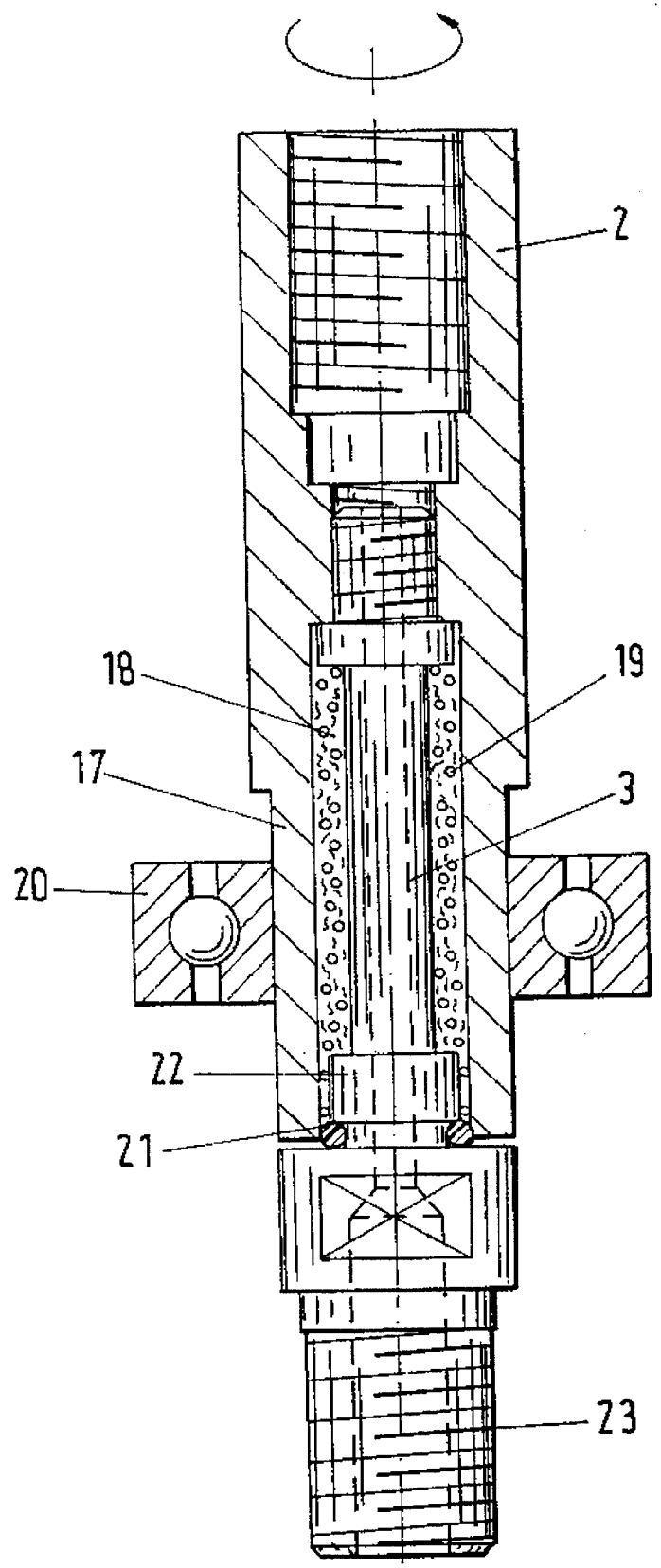
FIG. 2 is an axial cross-sectional view of a drill bit chuck for a drilling device, as shown in FIG. 1, joined to a drill shank by a resilient shaft.

FIG. 2 shows the structure of a drill shank 2 with a sleeve-shaped shank extension 17 which encloses a damping chamber 18, in which the resilient shaft 3 is inserted and surrounded by a damping agent 19. A grease supplemented with pellets can be used as the damping agent 19.

The sleeve-shaped shaft extension 17 is mounted in a radial bearing 20 and is sealed at its end face with respect to the shaft 3 by a seal 21. A stop element 22 secured to the shaft 3 limits the radial displacement of the resilient shaft 3.

At the leading end of the shaft 3 there is a drill bit chuck 23 in which the drill bit 4 (FIG. 1) is held fixed. In the embodiment shown in FIG. 2, the resilient shaft is caused to oscillate by self-excitation during the drilling operation, so that the desired radial displacement occurs in the region of the drill head.

Figure 3:
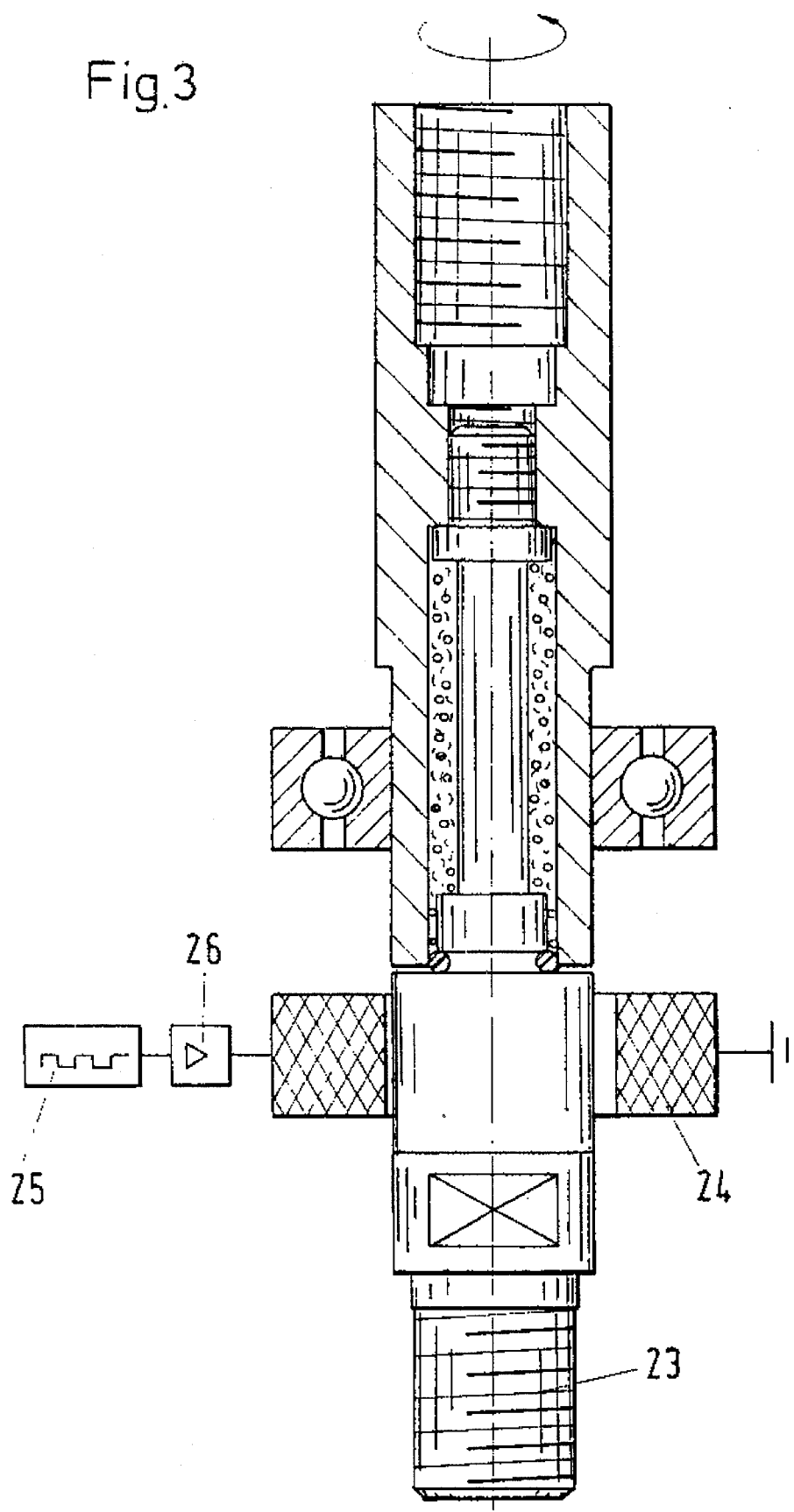
FIG. 3 is a partially axial cross-sectional view of a drill shank with resilient shaft as in FIG. 2, but including an electrical vibration device.

In the embodiment illustrated in FIG. 3, an electromagnet 24 is provided for the oscillating radial displacement of the drill bit chuck 23. The electromagnet 24 is triggered in pulses by an oscillator 25 and an output circuit 26.

Figure 4:
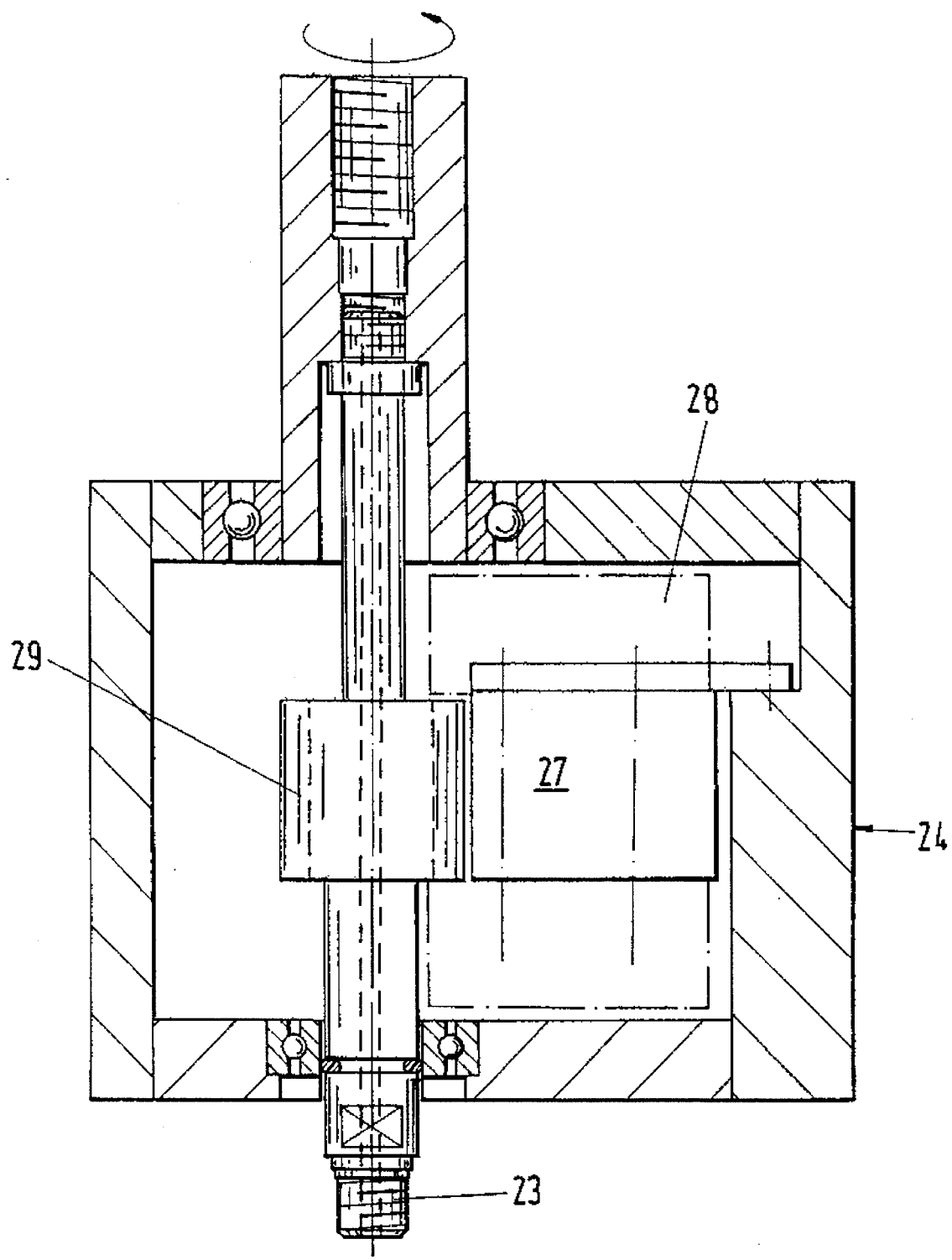
FIG. 4 is a detailed longitudinal cross-sectional view of an electromagnet acting on the resilient shaft.

In FIG. 4, the structure of the electromagnet 24 is illustrated in greater detail in longitudinal section. The coil 27 surrounds an iron core 28, the magnetic field of which acts on a ferromagnetic body 29 which is fixed to the shaft 3.

Figure 5:
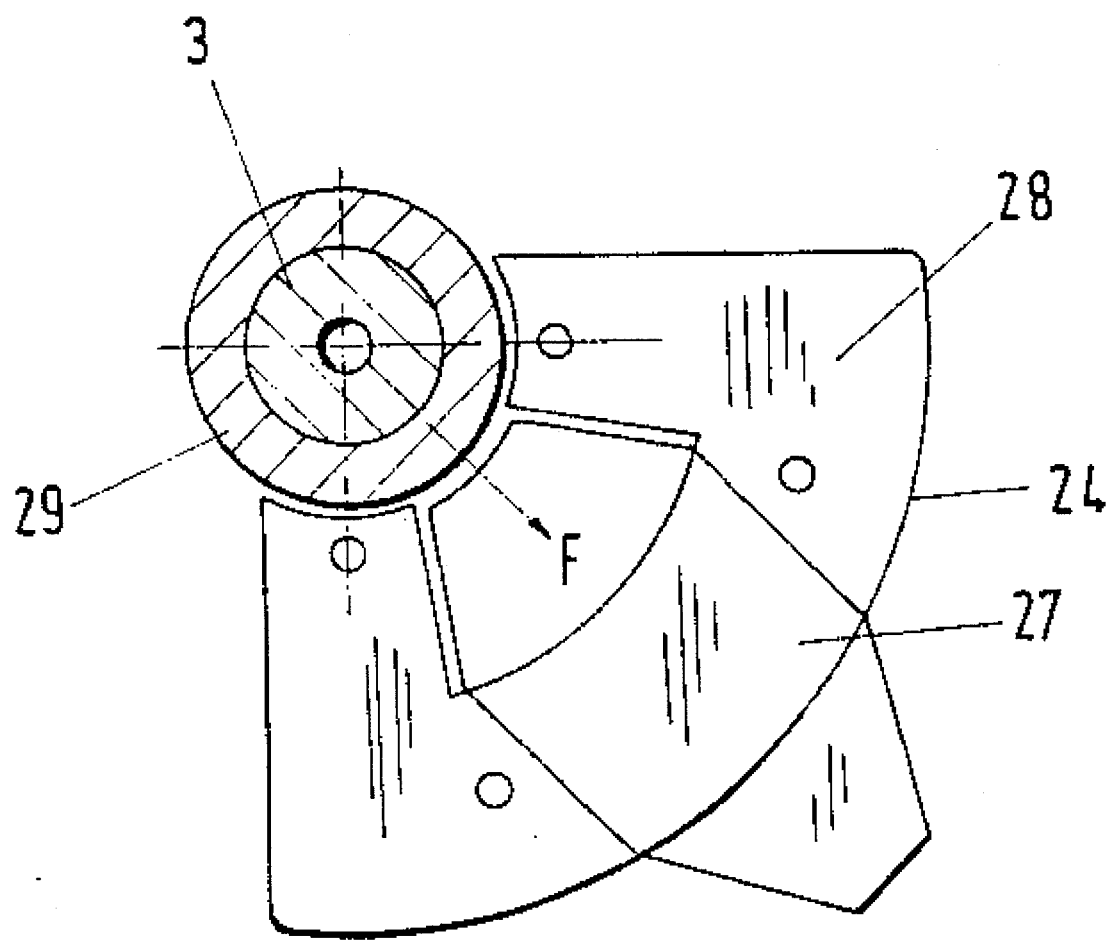
FIG. 5 is a partially transverse cross-sectional view, partially plan view of the device shown in FIG. 4.

In FIG. 5, the electromagnet 24 is shown in plan view and the body 29 fixed to the shaft 3 is shown in cross-section. The iron core 28 consists of a bundle of laminations. The force F from the electromagnet acting in pulses on the body 29 is indicated by a direction arrow extending radially from the body 29.

While the invention has been illustrated and described as embodied in a drilling device having a radially displacable drill shank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A drilling device for making a drilled hole in a panel, said drilling device comprising a driven drill shank (2) connected with a drill bit chuck (23), an axially projecting drill bit (4) held in the drill bit chuck (23) and having a front end abrasive face (6) for engagement with the panel (10) to form the drilled hole (15), means for relative displacement of at least one of the panel (10) and the drill bit (4) radially with respect to a center line of the drill shank (2) and radially resilient bearing means for radially resiliently mounting the drill bit chuck (23) holding the drill bit (4), wherein said radially resilient bearing means comprises a radially resilient shaft (3) connecting the drill bit chuck (23) and the drill shank (2).

2. A drilling device according to claim 1, wherein the drill shank (2) has a sleeve-shaped shank extension (17) provided with a damping chamber (18) filled with a damping agent (19) with said resilient shaft in said damping chamber (18).

3. A drilling device according to claim 2, wherein the damping chamber (18) is sealed by a radially resilient seal (21) surrounding the resilient shaft (3).

4. A drilling device according to claim 1, further comprising a vibration device (8) including means for producing radial oscillation of the drill bit chuck (23).

5. A drilling device according to claim 4, wherein the vibration device (8) comprises an electromagnet (24) for making a magnetic field acting in the vicinity of the drill bit chuck (23) and the resilient shaft (3) and means (25,26) for pulsed excitation of said electromagnet (24).

6. A drilling device according to claim 1, further comprising stop means (22) for limiting radial displacement of the resilient shaft (3), said stop means (22) being mounted on the resilient shaft (3).

7. A drilling device according to claim 2, further comprising a radial bearing (20) in which the shank extension (17) is mounted.

8. A drilling device according to claim 1, wherein the drill bit (4) has a drill head (5) widening towards the front end abrasive face (6) and the abrasive face (6) is inclined relative to said center line.

9. A drilling device according to claim 1, wherein the drill bit (4) has a drill head (5) widening towards the front end abrasive face (6), and the abrasive face (6) is stepped asymmetrically relative to said center line.

10. A drilling device according to claim 1, further comprising an oscillating table (11) for radially oscillating the panel (10) relative to the drill bit (4) and a vibration device (13) for horizontally oscillating the oscillating table (11).

* * * * *